United States Patent
Wang

(10) Patent No.: US 7,327,087 B2
(45) Date of Patent: Feb. 5, 2008

(54) PHOTOCATALYTIC FLUORESCENT LAMP PROVIDED WITH AN ANATASE TIO$_2$ COATING FILM

(75) Inventor: Wei-Hong Wang, Tao Yuan (TW)

(73) Assignee: Chung Shan Institute of Science and Technology, Tao Yuan (TW)

( * ) Notice: Subject to any disclaimer, the term of this patent is extended or adjusted under 35 U.S.C. 154(b) by 0 days.

(21) Appl. No.: 11/319,386

(22) Filed: Dec. 29, 2005

(65) Prior Publication Data

US 2006/0103316 A1    May 18, 2006

Related U.S. Application Data

(62) Division of application No. 10/760,524, filed on Jan. 21, 2004.

(30) Foreign Application Priority Data

Apr. 25, 2003  (TW) .............................. 92109831 A

(51) Int. Cl.
*H01J 61/35* (2006.01)
(52) U.S. Cl. ...................... 313/635; 313/489; 313/110
(58) Field of Classification Search ................ 313/635, 313/489
See application file for complete search history.

(56) References Cited

U.S. PATENT DOCUMENTS

| | | | |
|---|---|---|---|
| 4,982,712 A | 1/1991 | Abe | |
| 5,045,288 A | 9/1991 | Raupp et al. | |
| 5,439,652 A | 8/1995 | Sczechowski et al. | |
| 5,449,443 A | 9/1995 | Jacoby et al. | |
| 5,468,699 A | 11/1995 | Zhang et al. | |
| 5,480,524 A | 1/1996 | Oeste | |
| 5,646,090 A * | 7/1997 | Tamura et al. | ............... 503/227 |
| 5,650,126 A | 7/1997 | Taoda et al. | |
| 5,670,206 A | 9/1997 | Taoda et al. | |
| 6,024,929 A | 2/2000 | Ichikawa et al. | |
| 6,135,838 A | 10/2000 | Wang | |
| 6,242,862 B1 * | 6/2001 | Kawakatsu | ............... 313/634 |
| 6,336,998 B1 | 1/2002 | Wang | |
| 2001/0008696 A1 * | 7/2001 | Takahama et al. | ........... 428/446 |

FOREIGN PATENT DOCUMENTS

| | | | |
|---|---|---|---|
| EP | 825634 A2 * | 2/1998 | |
| JP | 11009994 A * | 1/1999 | |

* cited by examiner

*Primary Examiner*—Mariceli Santiago
(74) *Attorney, Agent, or Firm*—Birch, Stewart, Kolasch & Birch, LLP

(57) ABSTRACT

A method of preparing semiconductor nano crystal anatase TiO$_2$ solution uses titanium alkoxide Ti(OR)$_4$ as a main component in combination with chelating agents in aqueous solution. A fluorescent lamp tube is coated with the semiconductor nano crystal anatase TiO$_2$ solution to form a photocatalytic coating fluorescent lamp capable of cleaning air. Then a baking step is carried out at a low temperature about 100-250° C. By doped anatase TiO2 with small amount about 0-1.0 wt % of precious metals complex or transition metals oxides as nano-particle on or in the anatase TiO2 nano-particle surface, the visible light photocatalysis efficiency is increased for air cleaning. By doped with small amount Eu$^{+3}$ or rare earth metal ion on or in the anatase TiO2 nano-particle surface, which is a photocatalytic material acting as fluorescent agent, the fluorescent lamp has increasing brightness of when it is turned on.

5 Claims, 10 Drawing Sheets

PHOTOCATALYTIC FLUORESCENT LAMP PROVIDED WITH AN ANATASE TIO$_2$ COATING FILM

This application is a Divisional of application Ser. No. 10/760,524, filed on Jan. 21, 2004, and for which priority is claimed under 35 U.S.C. § 120; and this application claims priority of application Ser. No. 092109831 filed in Taiwan, R.O.C. on Apr. 25, 2003 under 35 U.S.C. § 119; the entire contents of all are hereby incorporated by reference.

BACKGROUND OF THE INVENTION

1. Field of the Invention

The present invention relates to a fluorescent lamp capable of cleaning air, and more particularly, to a fluorescent lamp coated with nano-crystalline anatase TiO2 sol, which is a photocatalytic material acting as fluorescent agent, which is capable of increasing brightness of the fluorescent lamp when it is turned on.

The present invention also discloses a method comprising the steps of preparing semiconductor nano-crystalline anatase TiO$_2$ solution using titanium alkoxide Ti(OR)$_4$ as a main component in combination with chelating agents and than hydrolysis in aqueous solution, which semiconductor nano-crystalline anatase TiO$_2$ solution is then coated onto surface of a fluorescent lamp tube. The fluorescent lamp tube coated with the semiconductor nano-crystalline anatase TiO$_2$ solution is then baked to form a photocatalytic coating fluorescent lamp capable of cleaning air. The baking step is carried out at a low temperature in a range of 100-250° C. The fluorescent lamp comprises straight type tubes, annular shaped tubes, U-shaped tubes, spiral-shaped tubes, and special dual layer tubes.

2. Description of the Related Art

Photocatalysts have been developed for treating waste gases for the past few years, such as those described in, for example, Gregory B. Roupp & Lynette A. Dibble, Arizona State University, U.S. Pat. No. 5,045,288; Jeffrey G Sczechowski et al., The University of Colorado, U.S. Pat. No. 5,439,652; William A. Jacoby & Daniel M. Blake, U.S. Pat. No. 5,449,443; Zhenyu Zhang & James R. Gehlner, Inrad., U.S. Pat. No. 5,468,699; and Franz D. Oeste & Olga Dietrich Neeleye, U.S. Pat. No. 5,480,524.

The above-mentioned patents relate to treatment of waste gases, and were basically carried out in a hermetically sealed reactor. Utilization or operation of granular photocatalysts or photocatalysts coating granules therefore usually needs, in general, complex equipment to handle.

The above-described prior art examples have disadvantages making the prior art photocatalysts difficult to apply in the field of air pollutant treatment for a living environment. Of them, one waste water and/or waste gases disposal photocatalytic reactor comprising a UV lamp inserted into matrix with photocatalysts coated fibers, thereof is described in Michael K. Robertson & Robert G Henderson, Nutech Energy Systems Inc., U.S. Pat. No. 4,982,712. As mentioned above, such a reactor was a closed type one such that counter-flow of gases must be forced by a blower that makes such a reaction system impractical when used in living environments.

UV lamp treatment for waste gases is generally based on the sustained oxidative degradation against organic and/or inorganic hazardous materials in the air by a photocatalytic reaction to render them into non-harmful substances such as water or carbon dioxide. For example, U.S. Pat. Nos. 6,135,838 and 6,336,998, which are owned by the applicants of the present application, all describe such a UV lamp. Since the UV lamp is not a commercially available lighting apparatus, some research has focused on a commercial fluorescent lamp having a photocatalytic coating for cleaning air.

Hiroshi Taoda and Watanabe, U.S. Pat. Nos. 5,650,126 and 5,670,206, discloses a fluorescent lamp coated with titanium dioxide sol, than baked to 350-500° C., for deodorized the air. And the U.S. Pat. No. 6,024,929 by Ichikawa Shinichi, Furukawa Yashinori, and Azuhata Shigeru discloses a light-transmissive and transparent film photocatalyst made of anatase-type titanium dioxide and alpha type iron oxide formed on an outside surface of a glass tube used for a fluorescent lamp. The thin film photocatalyst is formed by sol-gel coating. But the temperature for baking the solution adhered to the outside wall of the glass tube is in a range of 450-600° C. when forming the thin film anatase-type titanium dioxide and is in a range of 560-770° C. when forming the alpha iron oxide $\alpha$-Fe$_2$O$_3$. By baking the solution at so high temperature in the above-mentioned ranges, which made the coating too dense to work with high efficiency in photocatalysis for air cleaning.

U.S. Pat. No. 6,242,862 by Akira Kawakatsu and Kanagawa-ken discloses a photocatalytic membrane on a lamp with lighting fixture. The membrane is formed using TiO$_2$ anatase particle dispersed liquid coating with a ground layer. The ground layer made of a metallic oxide : such as silane coupling agent, SiO$_2$ sol, TiO$_2$ sol, or Al$_2$O$_3$ sol, also with multi-layer structure provided lot of penetrating holes for increase the photocatalytic efficiency. However, the anatase TiO2 particles are obtained from a high temperature sinter process. Although the TiO2 Anatase particles are dispersed in an alcohol solvent, the hydroxyl groups on the particle surfaces are still at a low level, resulting in poor adhesion to the fluorescent lamp. For this reason, inorganic materials for enhancing adhesion such as silane coupling agent, SiO$_2$ sol, TiO$_2$ sol, or Al$_2$O$_3$ sol is needed. This inorganic materials distributed in lower the photocatalytic effect and lower the air cleaning efficiency, too.

SUMMARY OF THE INVENTION

Accordingly, the primary object of the invention is to provide a method for preparing anatase TiO$_2$ nano-scale crystal particle solution. The particle size of the anatase TiO$_2$ is below about 20 nm. Since the anatase TiO$_2$ nano-crystalline particle is made in a water-based solution, bountiful hydroxyl groups are presented on the surface. When the anatase TiO$_2$ sol is baked at low temperatures in a range of about 100-250° C. for removing organic solvent and organic additives, thereby obtaining a good adhesion and nano-scale anatase TiO$_2$ porous coating. Because the anatase TiO$_2$ particle is below about 20 nm, the primary particle achieves at 1.0 nm scale. Due to the characteristic of such nano-scale material, the anatase TiO$_2$ coating presents photocatalystic effects even in the visible light range. Further, since no high-temperature annealing is needed, the nano-scale anatase TiO$_2$ coating is porous. Air and organic/inorganic pollutants more easily diffuse to the inside of the TiO$_2$ coating. On the other hand, the electron-hole pairs originally generated inside the TiO$_2$ Anatase crystal, more easily migrate to the outer side of the TiO$_2$ Anatase crystal, thereby improving the deodorization effect, bactericidal and fungicidal activity and contamination prevention effect.

It is another object of the present invention is to provide a fluorescent lamp coating with the above-mentioned anatase TiO$_2$ nano-crystalline sol. Since the anatase TiO$_2$ crystal particle is in the nano scale, the photocatalytic reaction with quantum effect to lower the activation energy. The activation energy has an original maximum value of about 0.5 eV as band bending energy. As a result of the reduction of particle size, the activation energy is lower than about 0.3 eV, which means about a 0.2 eV energy shrinkage, at least. This enables the visible light photocatalyst to be formed, which works originally under a 385 nm UV light. It is evidenced that the anatase $TiO_2$ crystal particle formed according to the present invention can function at about 425 nm, or at an even wavelength such as about 512 nm, when the band bending energy approach zero.

To achieve these and other advantages and in accordance with the purposes of the present invention, as embodied and broadly described herein, the present invention provides a method for fabricating a photocatalytic fluorescent lamp capable of cleaning air. The method comprises preparing semiconductor nano crystalline anatase $TiO_2$ solution using titanium alkoxide $Ti(OR)_4$ as a main component in combination with chelating agents in aqueous solution, dip coating the semiconductor nano crystalline anatase $TiO_2$ solution on surface of a fluorescent lamp tube and baking the fluorescent lamp tube coated with the semiconductor nano-crystalline anatase $TiO_2$ solution to form a photocatalytic coating fluorescent lamp capable of cleaning air. The baking temperature is carried out at a low temperature in a range of about 100-250° C., because the anatase $TiO_2$ nano-crystalline already formed in solution. When the photocatalytic coating fluorescent lamp is turned on, brightness of the fluorescent lamp increases because of the fluorescent property of the semiconductor nano crystalline anatase $TiO_2$. Due to the porous characteristic of the anatase $TiO_2$ solution coating and its visible light photocatalytic ability, a small amount of WV light (UVA) and visible light generating by the fluorescence in the lamp are absorbed by the nano anatase $TiO_2$ coating, thus generating active species such as electron-hole pairs that are capable of cleaning air.

The anatase $TiO_2$ solution, anatase $TiO_2$ sol or anatase $TiO_2$ film developed according to this invention features its ability to increase brightness of the fluorescent lamp when the anatase TiO2 sol is coated on an outside wall of the glass tube of the fluorescent lamp. It is surprisingly found that the brightness of the coated fluorescent lamp is improved by 1.0% when compared to a fluorescent lamp without an anatase TiO2 sol coating. When we used fluorescent spectrometer to measure the nano-TiO2 Anatase materials, which had absorption band around 395 nm as excitation, with fluorescent band around 480 nm as emission. It is evident that the $TiO_2$ sol developed according to this invention also acts as fluorescent agent. It is known that a fluorescent lamp typically has a phosphorous layer coated on the inner wall of the vacuum glass tube. High energy ultraviolet (UV) light are generated due to the collision between free accelerated electrons and gaseous mercury between two electrode at high voltage in high vacuum with small amount of inert gas. The high energy UV light irradiates the phosphorous layer coated on the inner wall of the vacuum glass tube and absorbed by the phosphorous and generated fluorescence of visible light and a small amount of near UV (UVA). It is known that only the small amount of UVA either generated, can penetrates through the calcium glass tube. The fluorescent light spectrum of a conventional fluorescent lamp is shown in FIG. 4. Another fluorescent lamp with RGB composite fluorescent has the visible RGB fluorescence with spectrum is shown in FIG. 5. It is shown that all with a small amount of UVA ($\lambda$=365 nm) photons is present in the fluorescence. According to the present invention, not only the small amount of UVA photons are absorbed by the anatase $TiO_2$ coating but also the violet even the blue light can be absorbed, and thus induces photocatalytic reactions (assisted by active electron-hole pairs) therefrom. The photocatalytic reactions catalyze organic or inorganic gaseous substance absorbed on the catalyst to be decomposed. If the organic or inorganic gaseous substance is insufficient to attend the photoreaction, excess excited electron-hole pairs will recombine to their ground state and release fluorescent light or thermal heat.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
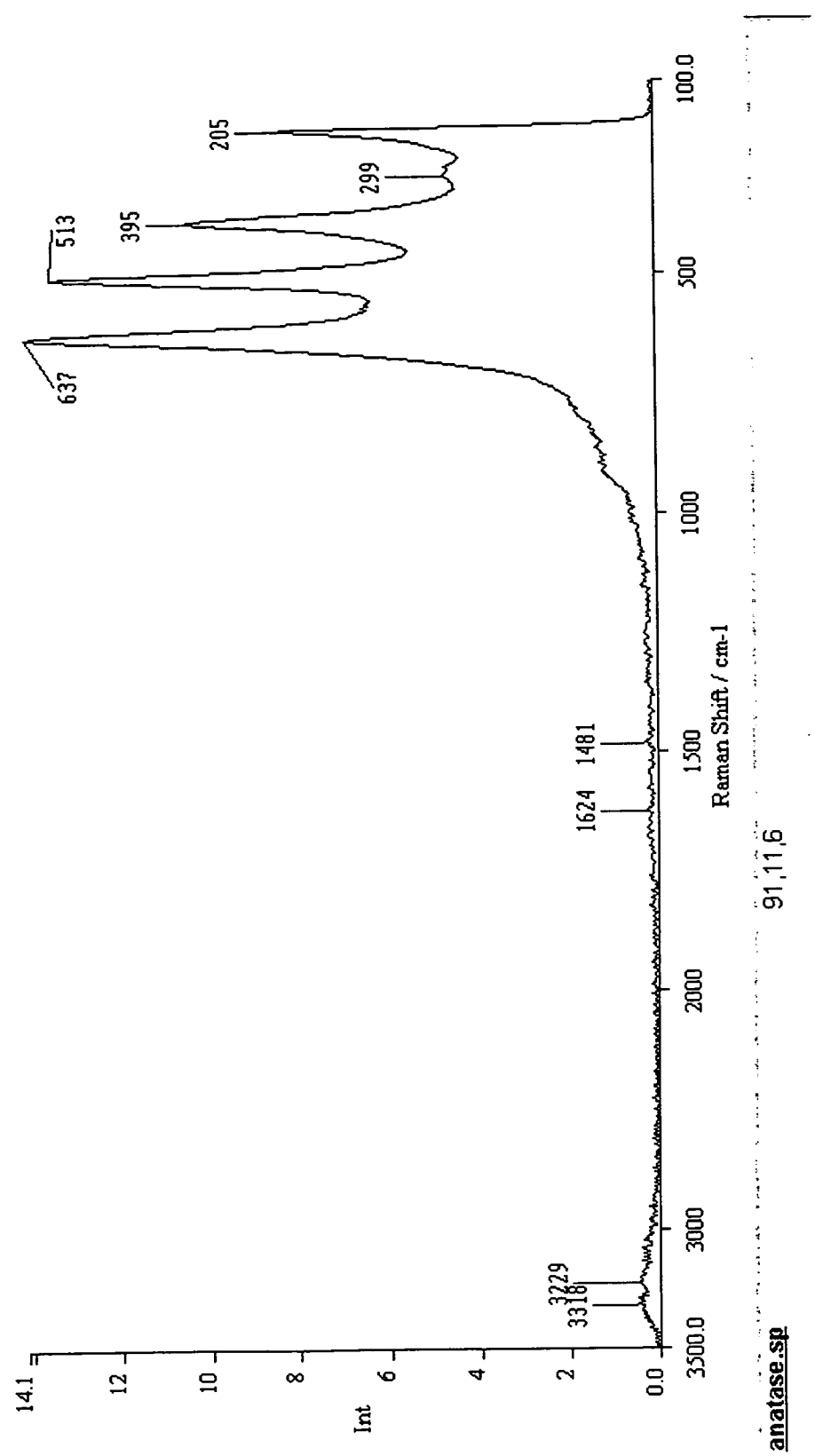
FIG. 1 shows Raman spectrum of anatase TiO2 powder.

The present invention uses sol-gel technique to prepare anatase TiO2 semiconductor nano-crystalline solution, hereinafter referred to as anatase TiO2 sol, which is used for the photocatalytic coating of substrate, such as glass, ceramic, active carbon, metals, plastics or synthesis fiber clothes. The coating is air dried at room temperature and then baked at temperatures about 100-250° C. For increase waste gas decomposed efficiency (or water treatment efficiency), precious metals or transition metal oxides are added to the prepared anatase TiO2 solution. Alternatively, the coating may be dipped in a solution containing precious metals or transition metals ions, followed by thermal drying and photo-reduction.

After the fluorescent lamp for lighting purposes is coated with TiO2 anatase sol or doped with rare earth metal (less than 10 wt %) TiO2 anatase sol to maintain the maximum photocatalysis for air cleaning ability but also could increase the brightness cause the fluorescent property of the photocatalyst materials. It is advanced to use the present invention because the anatase $TiO_2$ or Eu doped anatase $TiO_2$ particle in the nano-scale has photo-luminescence with 480 nm or 615 nm fluorescence property and quantum well effect, and thus cause have photocatalystic effect but also increase the brightness of the fluorescent lamp when it turn on.

1. Preparation of Anatase TiO2 Solution.

The photocatalyst solution used in the above-said process for coating photocatalyst contains as the main component a titanium alkoxide such as Ti(OR)4, wherein R is a hydrocarbon group, $C_nH_{2n+1}$, where n=1-5, and is, for example, methyl, ethyl, n-propyl, isopropyl, n-butyl, t-butyl, sec-butyl, pentyl and the like. Since the anatase $TiO_2$ particle is stable in a pH<2.5 acid solution and a pH>7.0 alkaline solution, both acid-type anatase $TiO_2$ solution and alkaline-type anatase $TiO_2$ solution have been developed. To ensure that about 80% of $TiO_2$ particles are under a particles size of about 10 nm size, chelating agents are incorporated with the titanium alkoxide $Ti(OR)_4$ hydrolysis in water or water contained solvent as $TiO_2$ gel. Acids or Alkali are used for peptizing this TiO2 gel by adjust the pH value of the solution. Organic acids include $CH_3COOH$ or RCOOH. Inorganic acids Include $HNO_3$ or HCl. Organic alkali include quadruped alkyl ammonium ($R_4NOH$) or alkyl amine $NR_3$. Strong chelating agents such as Acetonacetate $[RC(O)CH_2C(O)R]$, amino acid $[RCH(NH_2)COOH]$, succinic acid [HOOCCH(R)COOH], and organic alcohol $[RC_6H_3(OCH_3)OH]$ are also used. The amount of strong chelating agent added should be within a molar ratio of 0.01-1.0 for chelating agent/$Ti(OR)_4$. The chelating agent is used before the hydrolysis of the $Ti(OR)_4$ and reacts with the $Ti(OR)_4$ to form $Ti(OR)_4$-SCA complex, SCA meaning Strong Chelating Agent. The complex is then added into water or water-containing solution for hydrolysis so as to form $H_xTiO_{[(3-x)/2+x]}$-SCA. Since the molar ratio of chelating agent/$Ti(OR)_4$ is less than about 1.0, after hydrolysis, the $H_yTiO_{[(4-y)/2+y]}$ mixes with the $H_xTiO_{[(3-x)/2+x]}$-SCA to form a gel. Alternatively, $Ti(OR)_4$ can be added into water to form a $H_yTiO_{[(4-y)/2+y]}$ gel and then a chelating agent is added to form the $H_yTiO_{[(4-y)/2+y]}$-SCA gel.

Both the above $H_yTiO_{[(4-y)/2+y]}/H_xTiO_{[(3-x)/2+x]}$-SCA gel or $H_yTiO_{[(4-y)/2+y]}$ gel are hereinafter referred to as $TiO_2$-SCA gel. To prepare the anatase TiO2 nano -crystalline, acids such as $HNO_3$, HCl, or HF, and alkali such as $NH_3$ or $NH_4OH$ are used to adjust the pH value. Acids are used to adjust the solution to about pH<2.5, while the alkali are used to adjust the solution to about pH>7.0. After adjusting the pH value, most of the $TiO_2$ gel begins to be peptized, and undergoes rapid peptizing when heated. At this phase, crystalline particles form after the hydrothermal process. To obtain crystalline $TiO_2$ particles, the process temperature has to be kept above 100° C. as hydrothermal process. The resultant anatase $TiO_2$ particle size relates to the type of chelating agent, chelating agent concentration and dispersion technique which applied in peptizing or hydrothermal process. It is found that a high efficiency dispersing technique can lower the anatase $TiO_2$ particle size. The hydrothermal time and temperature both are factors for yield of the anatase $TiO_2$ particle. A higher temperature or a longer hydrothermal results in anatase $TiO_2$ particles having better crystal structure. Preferably, the temperature is below 250° C. However, it is noted that a higher temperature or longer time for hydrothermal also results in a larger crystal size exceeding 100 nm. The type of chelating agent and its concentration depend on process, properly pH value and temperature are selected, about 1 to 7-hour hydrothermal is preferably carried out to form anatase TiO2 sol.

Typically, the anatase $TiO_2$ sol is an aqueous solution. When applying above-said sol to coat a fluorescent lamp by using an outside coating method, the anatase $TiO_2$ sol of this invention either made from acid process or alkaline process has a particle size below about 20 nm and extensive surface with hydroxyl group(—OH), thereby promoting adhesion to the lamp surface. When dip coating, a uniform anatase $TiO_2$ gel film can be formed. In one embodiment, alcoholic solvent may be added into the anatase $TiO_2$ sol. In another embodiment, anatase $TiO_2$ sol made from alcoholic aqueous solution is used, in which alcohol concentration to water is lower than about 50% by weight, to improve the properties of the anatase $TiO_2$ sol coating and the adhesion ability thereof.

In one embodiment, the $H_4TiO_4$ solution added to the main component anatase TiO2 sol. The $H_4TiO_4$ solution can be made from titanium alkoxide such as $Ti(OR)_4$, where R is a hydrocarbon group, $C_nH_{2n+1}$ and n=1-5, and is, for example, methyl, ethyl, n-propyl, isopropyl, n-butyl, t-butyl, sec-butyl, pentyl and the like. The titanium alkoxide is slowly added into water with water/titanium alkoxide molar ratio of 100-1000. The solution is stirred to hydrolyze so as to form the above-said $H_yTiO_{[(4-y)/2+y]}$ gel solution. The above-said $H_yTiO_{[(4-y)/2+y]}$ gel solution is filtered and washed, and re-filtered to obtain $H_yTiO_{[(4-y)/2+y]}$ gel. The thus-formed $H_yTiO_{[(4-y)/2+y]}$ gel is then dispensed into water to form water/titanium dioxide with a mole ratio of about 100-1000. After that, the thus-formed $H_yTiO_{[(4-y)/2+y]}$ gel solution is cooled down using ice water to below about 4.0° C. Then, a 33% $H_2O_2$ solution is added to the cooled $H_yTiO_{[(4-y)/2+y]}$ gel solution. The $H_2O_2$/titanium oxide molar ratio is 4.0. The temperature of the $H_yTiO_{[(4-y)/2+y]}$ gel solution is kept below 6° C. waiting for the $H_yTiO_{[(4-y)/2+y]}$ gel to be completely dissolved into transparent yellow $H_4TiO_4$. In practice, the concentration of the $H_4TiO_4$ may be adjusted to 1.0% by weight and stored in a PP plastic tank at 4° C. to become $H_4TiO_4$ gel-solution.

When adding the $H_4TiO_4$ gel-solution into the anatase $TiO_2$ solution, the $H_4TiO_4$ to anatase $TiO_2$ ratio is 0-10% by weight. During the addition of the $H_4TiO_4$ gel-solution, the anatase $TiO_2$ solution is cooled in iced water at 4° C. The mixture is then stirred and coated on the glass tube of a fluorescent lamp and then baked at 100-250° C., it is found that the adhesion ability, thickness, and solidity of the coated film are improved, without affecting its porosity.

Figure 2:
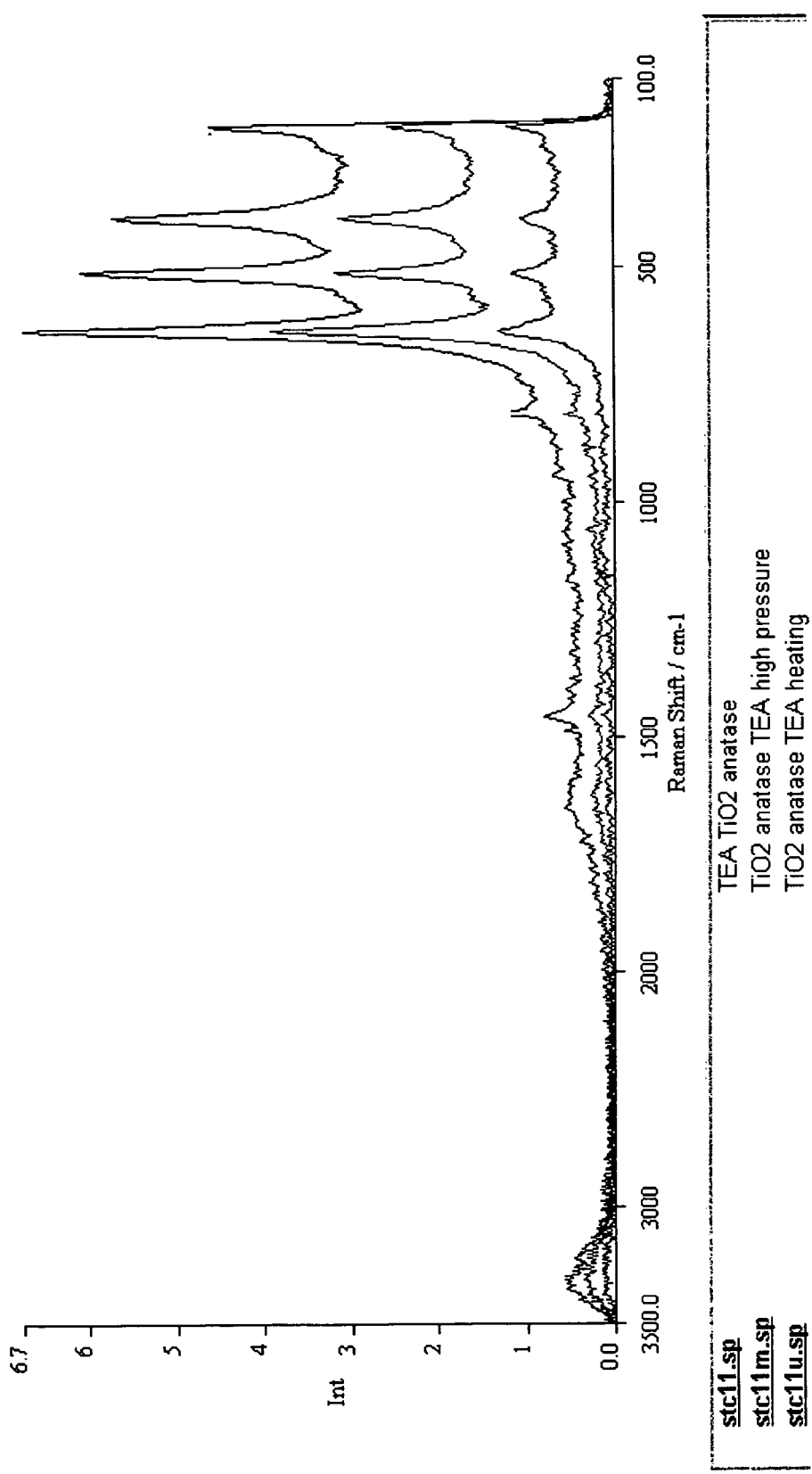
FIG. 2 shows Raman spectrum of anatase TiO2 sol.
Figure 3:
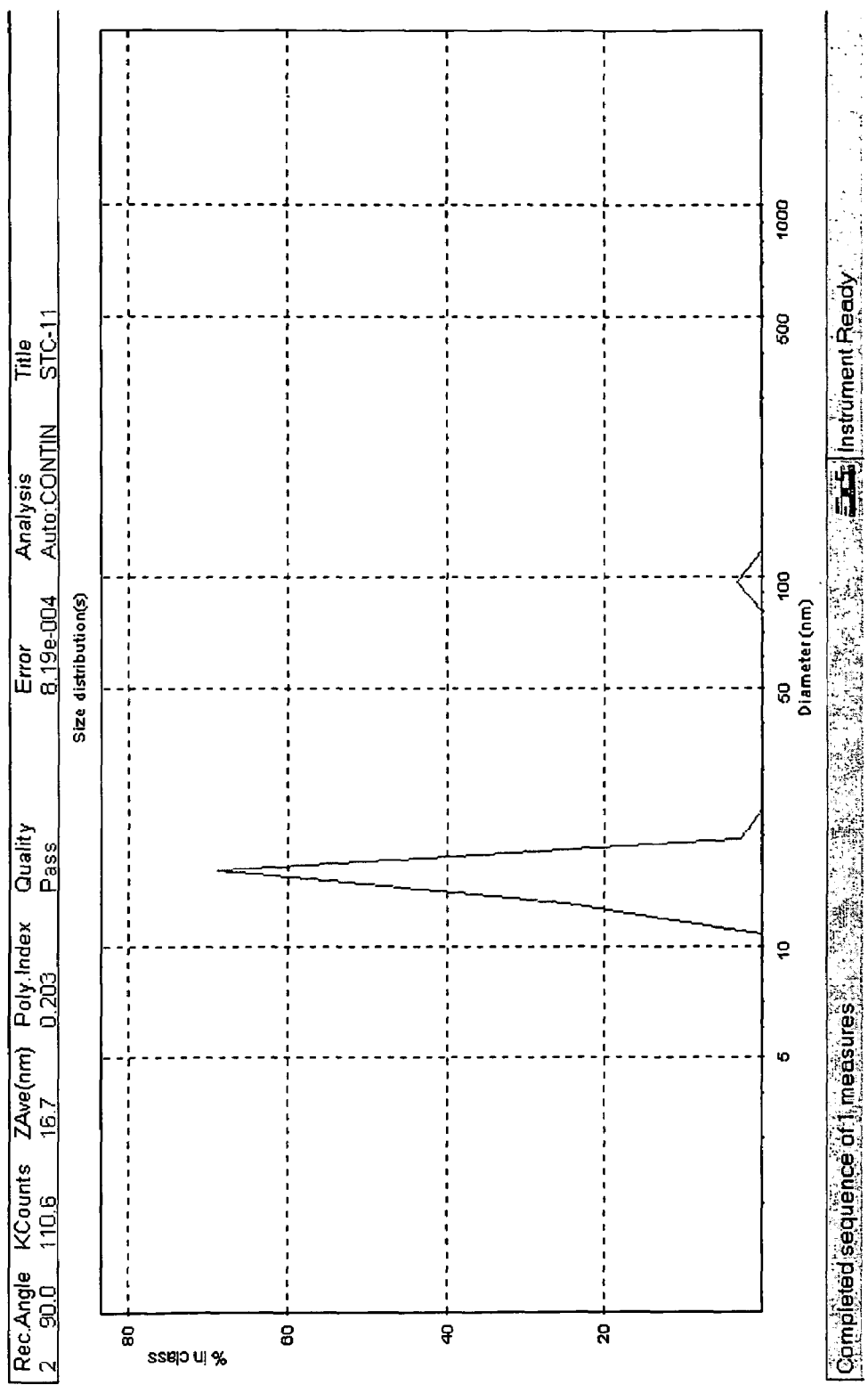
FIG. 3 shows DLS particle size analysis on anatase TiO2 sol.
Figure 4:
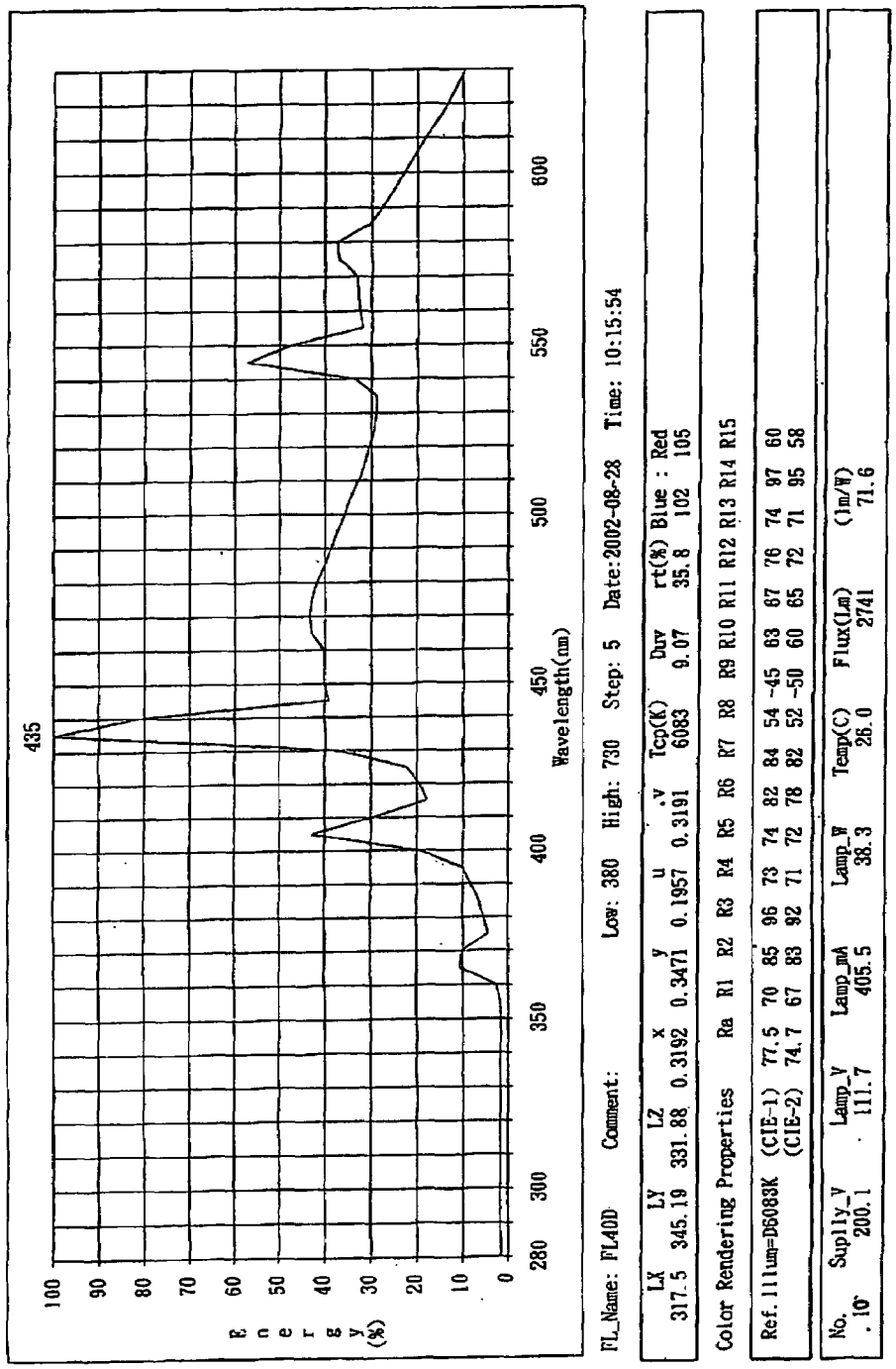
FIG. 4 is a spectrum of a conventional fluorescent lamp.
Figure 5:
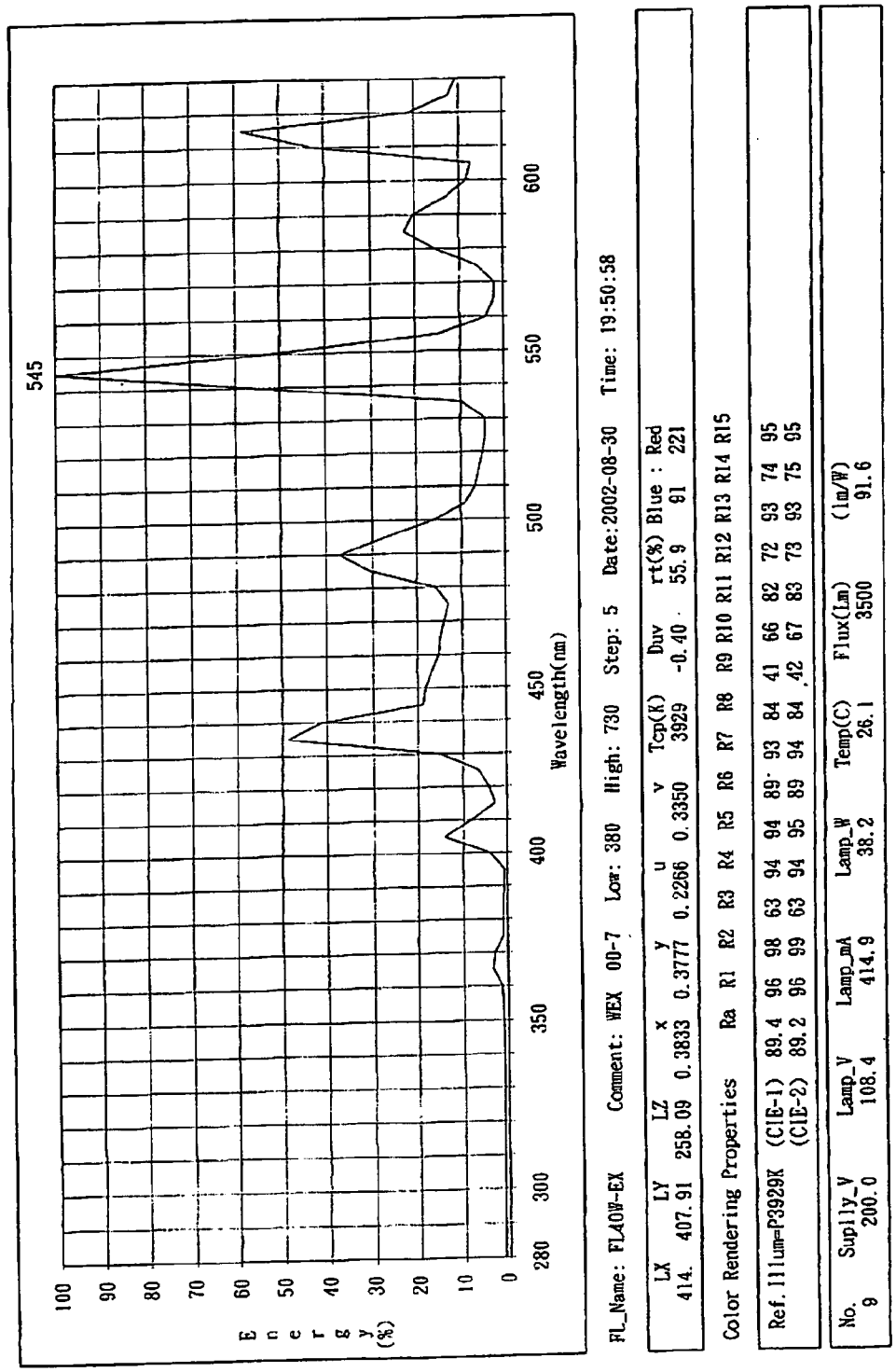
FIG. 5 is a spectrum of a RGB composite fluorescent lamp.

The thus-formed anatase $TiO_2$ solution is analyzed with Fourier-Transform Raman (FT-Raman) spectroscopy. The resultant Raman shift spectrum is illustrated in FIG. 2. The spectrum is measured by using 15 wt % anatase $TiO_2$ solution, which is irradiated by a 750 mW laser at a wavelength of 1060 nm. As shown in FIG. 2, split high-intensity peaks present at Raman shift 204 $cm^{-1}$, 398 $cm^{-1}$, 515 $cm^{-1}$, and 638 $cm^{-1}$, which are analogous to the solid anatase $TiO_2$ Raman shift spectrum as shown in FIG. 1. The particle size is analyzed by a Dynamic Laser Scattering method. As shown in FIG. 3, the result shows that about 80% of the anatase $TiO_2$ crystals have a particle size around 10 nm.

2. Photocatalytic Coating

The developed anatase $TiO_2$ solution, either acidic or alkaline, has a dominant particle size below 20 nm. To increase wetness when coating glass and to get a uniform photocatalytic coating, either the anatase $TiO_2$ solution prepared by using alcohol-containing solution or anatase $TiO_2$ solution added to a proper alcoholic solution is used. By utilizing such characteristics, a high-quality optical level anatase TiO2 solution photocatalytic coating on a fluorescent lamp can be achieved. As mentioned, to improve adhesion ability, thickness, and solidity of the coated film, proper $H_4TiO_4$ gel-solution may be added.

The refraction index of the glass tube of the fluorescent lamp is about 1.52, and the refraction index of the anatase $TiO_2$ is about 2.2. It is found that the anatase $TiO_2$ coating has a refraction index of 1.6-1.75, which is close to the refraction index of the glass tube of the fluorescent lamp. It is believed that the anatase $TiO_2$ has a complete crystal structure in the $TiO_2$ solution, and the baking process does not decrease the porosity of the particles in the coating. The natural packing of such particles can have a porosity of 37.5% to 50%.

There are two methods for coating the anatase $TiO_2$ solution film onto the glass tube of the fluorescent lamp. The first method is coated the anatase $TiO_2$ on the glass before the fluorescent lamp fabricated. When the clean glass tube is cut and finished with a side melting process, the two ends of the clean glass tube are sealed or capped. The capped clean glass tube is then dipped into the anatase $TiO_2$ solution in a vertical manner relative to the solution surface, then pulled out from the anatase $TiO_2$ solution in constant velocity. After this, the caps at both ends of the tube are removed, followed by baking at 150-250° C. for 10-60 minutes. The baking of the coating may be carried out in a baking machine, to avoid severely grinding the coating, the two ends of the glass tube are in contact with the clipper or a high-temperature transfer wheel.

The second method is employed after the fluorescent lamp is completed. Additional capping nuts are used to mask the electrode bases at both ends of the glass tube of the fluorescent lamp. The masked glass tube is then dipped into the anatase $TiO_2$ solution in a vertical manner relative to the solution surface and pulled out from the anatase $TiO_2$ solution in constant velocity. The fluorescent lamp is next baked at 150-250° C. for 10-60 minutes. The baking may be carried out in a batch type or continues type oven.

Figure 7A:
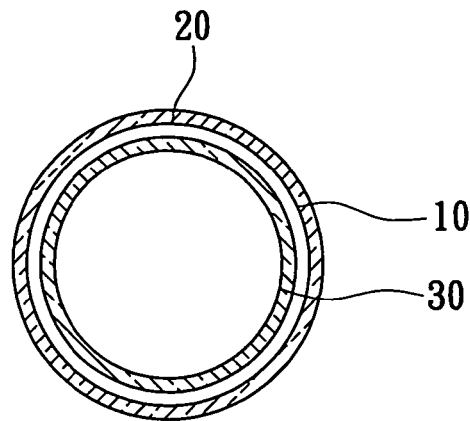
FIG. 7A is a cross section view showing the fluorescent lamp coated with anatase $TiO_2$.

When coating anatase $TiO_2$ solution onto the surface of the glass tube of the fluorescent lamp, the key to control the uniformity and thickness of the coating is avoiding vibration of the coating machine while pulling the glass tube from the anatase $TiO_2$ solution, and also the precise control of humidity and air cleanness. If the pullout speed is set at 30 cm/min, the concentration of the anatase $TiO_2$ solution is adjustable, such that the coating thickness can achieve the desired value. The control of the coating thickness is based on the coating thickness after finishing baking to finely tune the pullout speed. The thus-formed anatase $TiO_2$ solution coated fluorescent lamp is illustrated in FIG. 7A. The thus-formed anatase $TiO_2$ solution coated fluorescent lamp includes anatase $TiO_2$ sol coating (10), glass tube (20), and fluorescent coating (30).

Figure 7B:
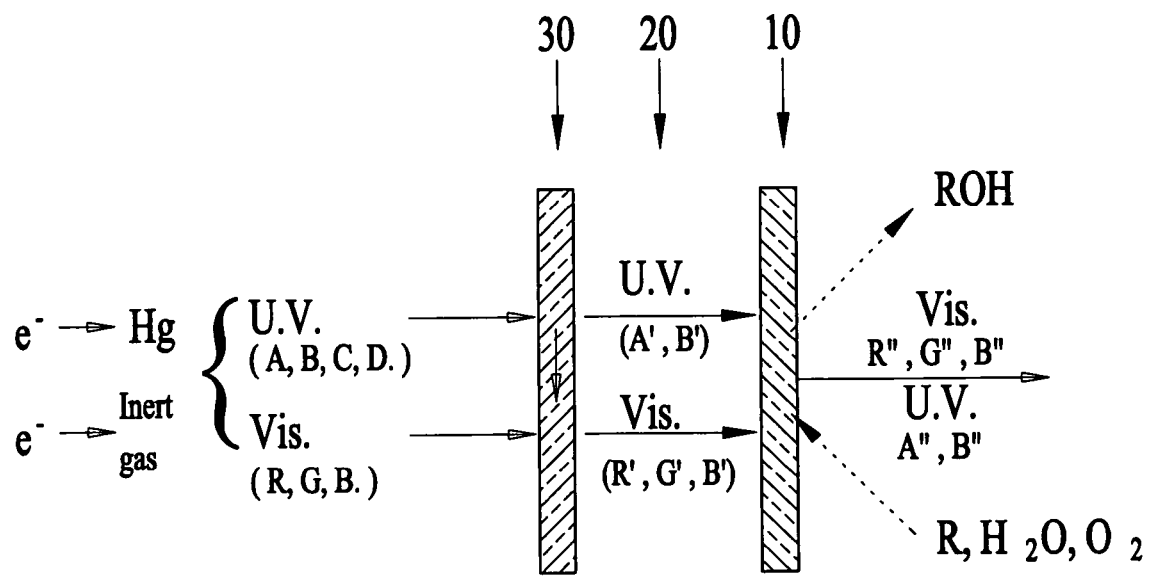
FIG. 7B is a schematic diagram showing reactions at the surface of the fluorescent lamp coated with anatase $TiO_2$.

FIG. 7B is a schematic diagram depicting how the anatase $TiO_2$ sol coated fluorescent lamp capable of cleaning air. Most fluorescent lamps have a vacuum tube having fluorescent materials coated on its interior walls. When the lamp is turned on, the electron cloud is generated by the heated electrodes under very low pressure. At AC or DC voltage, the electrons and charged atoms leave the opposite electrode and move through the tube toward the opposite electrode, some of them collide with the gaseous mercury atoms. These collisions excite the atoms, bumping electrons up to higher energy levels. When the electrons return to their original energy level, they release UV (and also visible) light photons. The UV light photons have energy distributed mainly at 365 nm (UVA), 315 nm (UVB), 254 nm (WVC), and 184 nm (UVD). The main energy bands of the visible light photons are 400-500 nm (blue light as VisB), 500-600 nm (green light as VisG), and 600-650 nm (red light as VisR). Hereinafter, the UV light intensities (UV light is generated by gaseous mercury atoms excited by free electrons) are presented with UVA, UVB, UVC, and UVD, and the visible light intensities are presented with VisB, Vise, and VisR. When the generated UV and visible light irradiate internal walls to be coated with fluorescent materials, the fluorescent materials absorb UVA, UVB, WVC, or UVD to produce different fluorescent light, which are mainly VisB, VisQ, and VisR. The UV light not absorbed by the fluorescent materials transmitted through the glass tube and are mostly absorbed by the glass tube. At this phase, the UV intensities decrease to WVA' and UVB', wherein the UVB' is almost zero. As for visible light intensities, the fluorescent visible light produced by the fluorescent materials mix with original visible light generated by the electron collided with the gaseous of mercury or inert gas, after transmitting through the glass tube is increased to intensities of VisB', VisG' and VisR' for illumination. Due to the different spectrum and intensities of the VisB', VisG' and VisR', the color temperature and brightness are thus different. But in real fluorescent Lamp, which have the visible light with the intensities of VisB', VisG' and VisR' and a small amount of UVA' of near UV light, some of them are absorbed by the anatase $TiO_2$ coating after transmitting through the glass tube. Depending on the structure and the photocatalytic ability of the $TiO_2$ coating, a small amount of UVA' and near UV light are absorbed to generate photocatalytic effects and fluorescent effects. Accordingly, the anatase $TiO_2$ coated fluorescent lamp capable of cleaning air and generating visible light with visible fluorescence having intensities as VisB", VisG", and VisR", and a remaining small amount of UVA" as near UV light. The photocatalytic anatase $TiO_2$ after absorbing UV light generates electron-hole pairs, which carry out oxidation-reduction reactions for air cleaning. If the produced electron-hole pairs do not react with organic or inorganic substances in the air timely, the electrons and the holes recombine to generate fluorescent as blue light. Most important, used the pure $TiO_2$ Anatase solution can be doped with Zn, Eu or like rare earth metal compounds by added to the TiO2 Anatase solution for coating on the fluorescent lamp can generate not only blue light but also generate green or red fluorescent light.

3. The procedure and apparatus for fabricating the anatase $TiO_2$ coated fluorescent lamp for air cleaning.

The glass tube of the fluorescent lamp is made of sodium calcium glass. The fabrication of the glass tube is known in the art. After the gradients of the glass to be hot melting and tube shaping, the long and straight glass tube is cut into certain lengths. The cut glass tube is subjected to cleaning, drying, and then fluorescent film coating. Fluorescent slurry comprising inorganic fluorescent agents, inorganic binders, organic dispenser, and organic solvent is injected from the upper end of the glass tube and flows down along the interior wall of the glass tube to form a fluorescent film thereon. The glass tube coated with fluorescent film is then baked at 400-600° C. in a continuous tunnel oven to get rid of organic substances and moisture. After this, an opaque white color fluorescent film is adhered onto the interior wall of the glass tube.

The glass tube coated with fluorescent film is then connected with electrode bases at both ends by using conventional melting joint method. The electrode bases are made from tungsten wiring melted with glass having thereon a glass venting tube. Through the venting tube, the glass tube is evacuated to a very low pressure, followed by injection of an amount of mercury and inert gas such as argon or helium. Then, the both ends of the glass tube are sealed by melt the venting tube. There are many types of fluorescent lamp, for example, straight tube shaped, ball shaped, U shaped, spiral shaped, annular shaped, or the like. Preferably, the anatase $TiO_2$ solution is carried out by dip coating. For straight tube or annular lamp products or semi-products without electrode bases and pins yet, a protection sleeve or protection plastic film can be used to mask the electrode bases and pins before the coating. After finishing coating, the protection sleeve or protection plastic film is removed and baking is performed. Alternatively, after coating, the lamp is directly baked without removing the protection sleeve or protection plastic film. For single-end connector lamps, the lamp products are coated by a base fixing method, while the semi-product lamps are coated by a clipping fix method.

It is advantageous to use the present invention anatase TiO2 solution to coat the lamps by dip coating method thereof, because the resultant $TiO_2$ coating can achieve a high-quality optical level, which cannot be achieved by conventional spray coating, brush coating, roller coating, or shower coating. According to the dip coating method of this invention, the lamp is fixed on a coating frame, to ensure high quality of coat, the coating speed is kept to below 30 cm/min. By way of example, a 120 cm, 40W fluorescent lamp needs at least 4 minutes for completion. The use of the coating frame enables 100 tubes to be coated at one time, that is, 3 seconds for each tube, thereby facilitating industrial mass production.

Figure 6A:
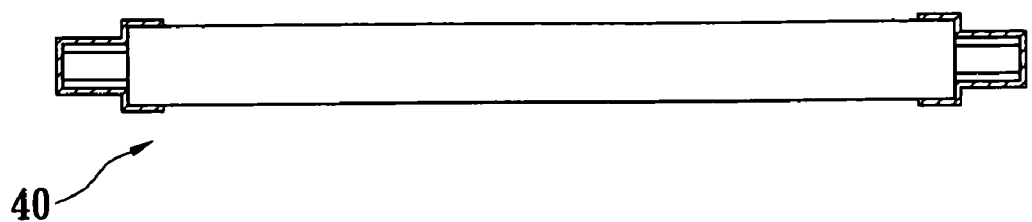
FIG. 6A is a diagram showing a straight tube fluorescent lamp.
Figure 8:
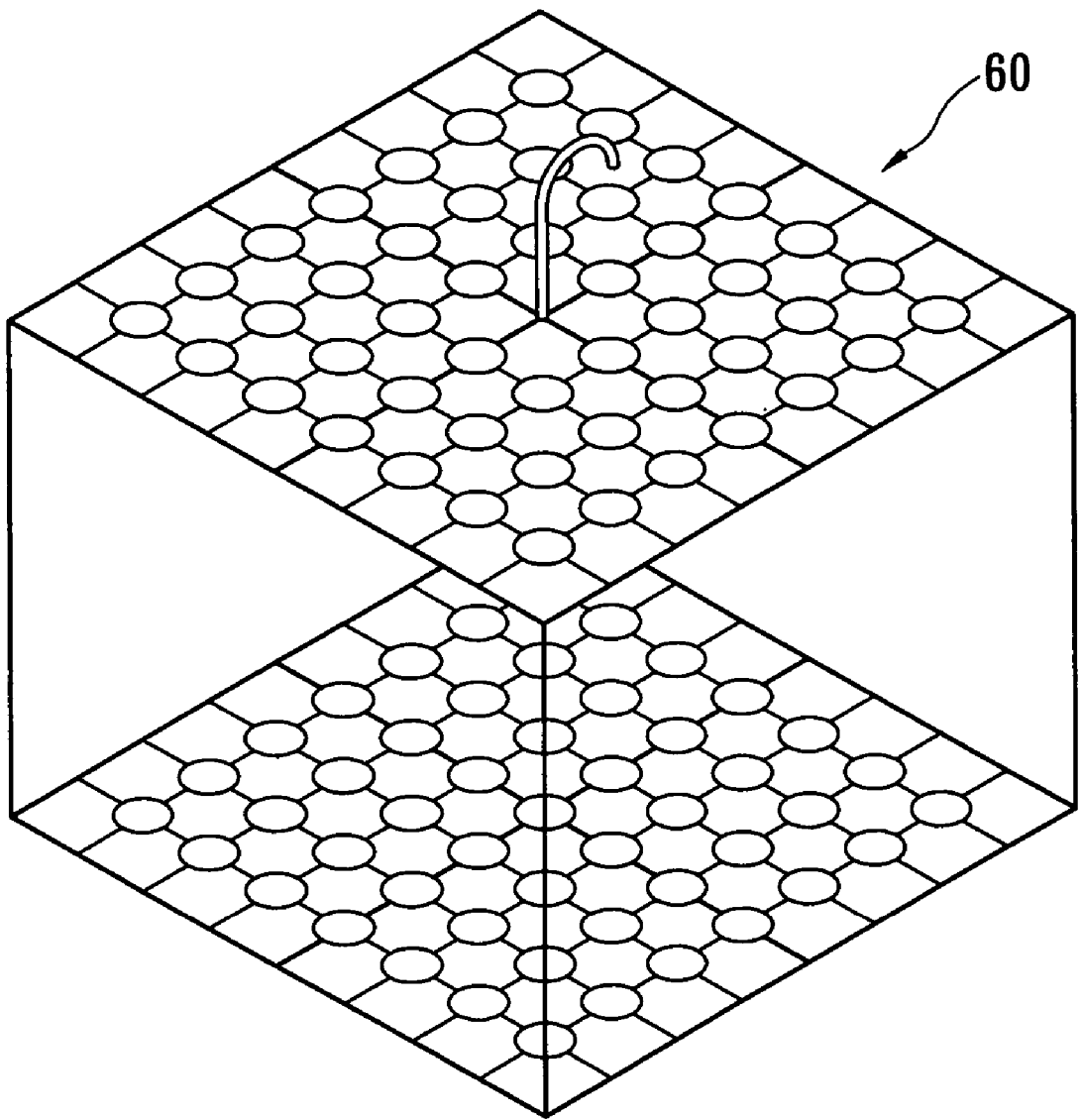
FIG. 8 is a schematic diagram showing the coating frame for dip coating straight tube fluorescent lamps in array.

This invention also proposes anatase TiO2 solution coating methods for either straight tube two-end fluorescent lamps or single-end fluorescent lamps. As shown in FIG. 6A, the straight tube two-end fluorescent lamp (40) has lamp cap and lamp pin at its two ends. To prevent contact with the anatase TiO2 solution during the dip coating process, the lamp cap and lamp pin are protected by a protection sleeve or thermal plastic film. The protected straight tube two-end fluorescent lamp (40) is then fixed on the coating frame. The coating frame is schematically shown in FIG. 8. The coating frame, which is made of stainless steel, has a hook at its top surface, with an upper and lower flushing plates with apertures. The upper plate has a clipping mechanism at the center of four apertures for fixing lamp cap and lamp pin. The distance between the upper and the lower flushing plates is adjustable and is adjusted to a condition that the lamps can easily enter and get out from the side or the lower apertures plate with the fixing mechanism on the aperture. By doing this, the lamps can be placed in the frame in an array, as shown in FIG. 8. The coating frame (60) has capacity of 7×7=49 tubes each time or 10×10=100 tube array.

The sol-gel coating for straight tube fluorescent lamp is carried out by first washing the lamp product in a washer or cleaning machine to remove surface oil and inorganic alkali. Acid or alkaline cleaning solution is not suitable at his stage, because the two ends of the lamp contain metal. Preferably, the lamp is brush washed using non-ionic surfactant solution, then washed by de-ionized water, followed by baking. After washing, the two ends of the lamp are covered with protection sleeve or thermal plastic film. The covered tubes are arranged and positioned on the coating frame, which is thereafter connected to the coating machine through the hook. The coating machine transfers the coating frame to dip into the anatase $TiO_2$ solution, and then pulls out the coating frame steadily at a pull speed of about 30 cm/min, such that a uniform coating of anatase $TiO_2$ is formed. After draining the excess anatase $TiO_2$ solution from the bottom, the coated tubes are transferred to an oven to bake at 150-250° C. for 30-60 minutes. To improve the hardness and strength of the anatase TiO2 coating, the tube may be coated with $SiO_2$ sol or $H_4TiO_4$ sol in advance by a dip coating method. After drying at room temperature, the tube is then subjected to an anatase $TiO_2$ coating and subsequent baking. It is understood that the thickness control of the coating by the gel-solution depends on gel-solution concentration and coating speed to achieve desired optical coating quality.

Figure 6B:
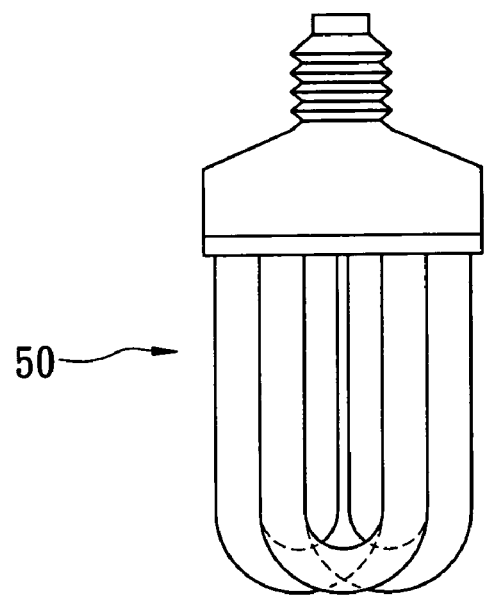
FIGS. 6B, 6C, and 6D are schematic diagrams showing single-end fluorescent lamps.
Figure 6C:
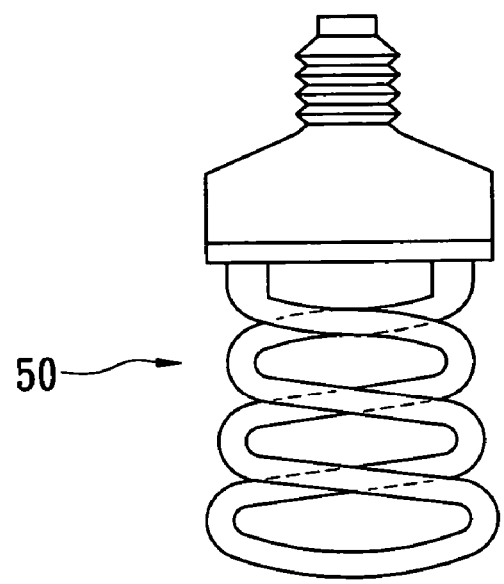
Figure 6D:
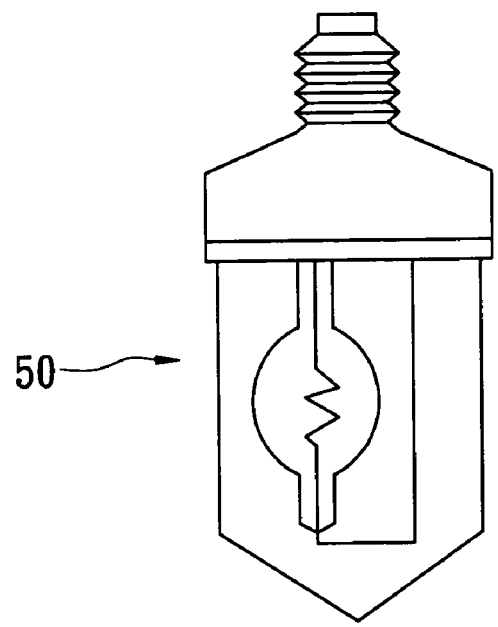
Figure 9A:
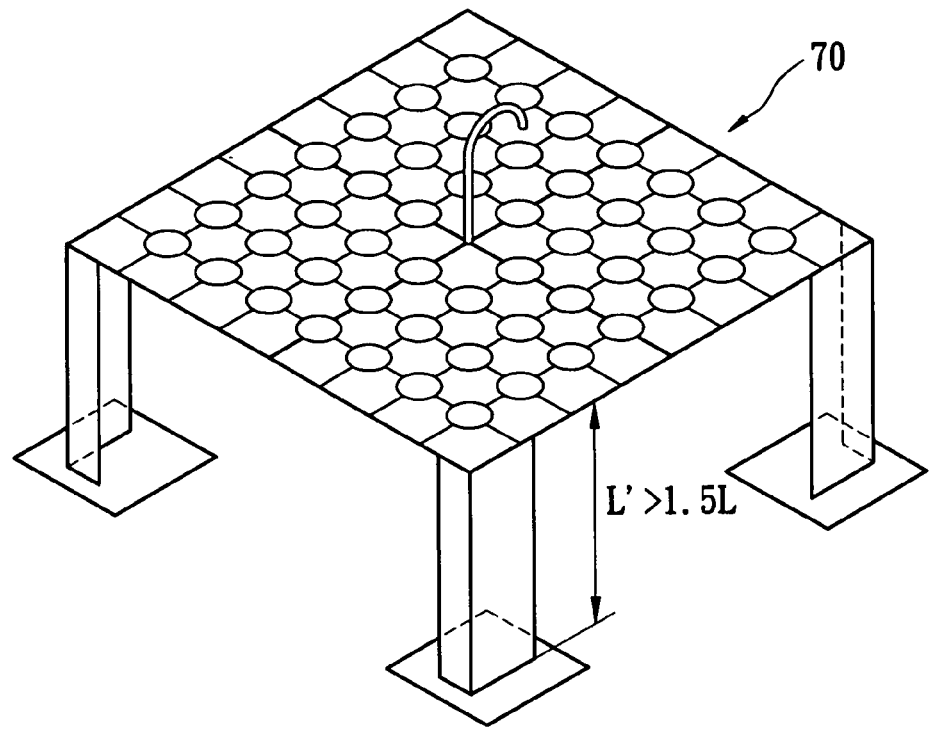
FIG. 9A is a schematic diagram showing the coating frame for dip coating single-end fluorescent lamps in array.
Figure 9B:
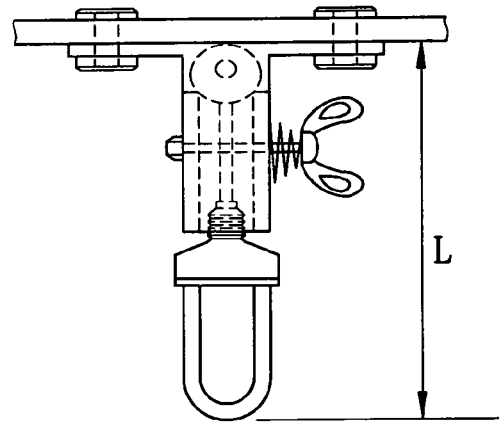
FIG. 9B is a cross section view showing the mechanism for fixing the single-end fluorescent lamp.

FIGS. 6B, 6C, and 6D illustrate various single-end fluorescent lamps, which are the current trend in fluorescent lamps. FIG. 6B shows a U-shaped lamp. The U-shaped lamp includes a single tube, dual tubes, and triple tubes. FIG. 6C shows a spiral lamp. FIG. 6D shows a special dual-layer lamp. The relative coating frames are shown in FIG. 9A and FIG. 9B. The coating frames shown in FIG. 9A has a frame height L'. The lamp base is fixed on a corresponding aperture of the coating frame (70). As shown in FIG. 9B, the working depth is L. The single-end lamp is screwed into the lamp connecter or clipped to the lamp base with lamp tube facing down, dipping into alcohol for minute to remove oil and residuals with air dried, then dipped into the anatase TiO2 solution, and then baked in the oven at 150-250° C. Since the length of the single-end lamp is relatively short, and the tube is bent with large angle, the pull speed is preferably 10-15 cm/min to ensure better quality.

4. Preferred embodiments of this invention.

The fabrication of the anatase $TiO_2$ solution coated fluorescent lamp capable of cleaning air involves the preparation of the anatase $TiO_2$ solution and the photocatalytic coating for fluorescent lamps. The currently adapted procedure for fabricating the photocatalytic coating fluorescent lamp includes the lamp product going through anatase $TiO_2$ solution dipping and coating, followed by 150-250° C. baking. In one embodiment, the semi-product glass tube goes through anatase $TiO_2$ sol dip coating, followed by 150-250° C. baking. The decomposition efficiency of the coated lamp is measured as evidence of the ability of the anatase $TiO_2$ sol coated fluorescent lamp for air cleaning.

EXAMPLE 1

About 1 mole titanium alkoxide such as $Ti(OR)_4$, where R is a hydrocarbon group, $C_nH_{2n+1}$ and n=1-5, and is, for example, methyl, ethyl, n-propyl, isopropyl, n-butyl, t-butyl, sec-butyl, pentyl and the like, is incorporated with chelating agents. Strong chelating agents such as organic acid RCOOH, Organic acetate $CH_3(O)CCH_2C(O)R$, amino acid $RCH(NH_2)COOH$, succinic acid $HOOCCH(R)COOH$, and organic alcohol $RC_6H_3(OCH_3)OH$ are used. The amount of strong chelating agent added should be controlled to a chelating agent/$Ti(OR)_4$ mole ratio of 0.01-2.0, and preferably 0.1-1.0. Preferably, the chelating agent is mixed with alcoholic solvent such as ethanol, propanol, iso-propanol, butanol, iso-butanol, or methanol before mixing with the titanium alkoxide. The amount of alcoholic solvent blended should be controlled to an alcoholic solvent/chelating agent mole ratio of 1-100, preferably diluted to a mole ratio of 10. The mixture of alcoholic solvent and the chelating agent is slowly mixed with the titanium alkoxide. The chelating agent reacts with the $Ti(OR)_4$ to form $Ti(OR)_3$-SCA complex, where SCA means Strong Chelating Agent. The complex is then added into water or alcohol-containing aqueous solution to hydrolyze. The water/titanium alkoxide mole ratio is 1-400, preferably 100. After hydrolysis, a white colored gel slurry is obtained, which is then subjected to inorganic acid titration. Suitable inorganic acid includes nitric acid, hydrochloric acid, hydrofluoric acid, or the like. After the titration, the pH value of solution is 1.0-2.0. Preferably, nitric acid is used for the titration. The gel solution is stirred and heated under normal atmospheric conditions. When the pH below 2.0 the gel begin to peptize and the solution becomes transparent. The hydrothermal temperature is further raised and pressure increases, but those were kept below 250° C. to prevent boiling. As mentioned, a higher hydrothermal temperature or a longer hydrothermal results in anatase $TiO_2$ particle having a better crystal structure. However, a higher hydrothermal temperature or longer hydrothermal also results in larger crystal size. To ensure that the anatase $TiO_2$ sol coating has good transmittance and planar topography, it is preferable that the anatase $TiO_2$ sol particle size is maintain between 10-100 nm. In practice, the actual anatase TiO2 sol particle size is 1-10 nm. In addition to hydrothermal conditions, temperature, time, stirring, and pH, the control factors for the particle size of the anatase $TiO_2$ sol further include the property and quantity of chelating agent as well as the property and quantity of titanium alkoxide. The resultant acidic anatase $TiO_2$ solution has a $TiO_2$ concentration of 0.2-10% by weight and is slightly yellow color transparent liquid.

In accordance with this preferred embodiment of the present invention, a 4 wt % anatase $TiO_2$ solution prepared by above-said process is used to coat various 40W fluorescent lamps including FL-40-W, FL-40-D, FL-40-WEX, and FL-40-DEX. The FL-40-W (white light) and the FL-40-D (sun light) use single visible light fluorescent agent such as $Ca_{10}(PO_4)_6FCl$: (Sb,Mn) (Nichia NP10, NP20). The FL-40-WEX (strong white light) and FL-40-DEX (strong sun light) may use three wave mixed fluorescent agent including $Sr_5(PO_4)_3Cl$: Eu (Nishia Np-103) blue light fluorescent agent, $LaPO_4$: (Ce, Th) (Nishia NP-220) green light fluorescent agent, and $Y_2O_3$: Eu (Nishia NP-340) red light fluorescent agent, or mixed-type fluorescent agent such as NP-93 or NP-96 by Nishia. The above-said fluorescent lamps are coated with anatase $TiO_2$ solution and baked at 150° C. The decomposition efficiency of the above-said fluorescent lamps regarding organic substance butyl acetate is measured in a 5-liter close chamber system. 5.0 µl butyl acetate is injected into the 5-liter close chamber system and measured by using FTIR during the irradiation of 40W fluorescent lamps. The results are shown in Table 1.

TABLE 1

| | UV 365 nm intensity (mW/cm$^2$) | Butyl acetate decomposition rate constant (min$^{-1}$) |
|---|---|---|
| FL-40-WA | 0.144 | 0.0324 |
| FL-40-DA | 0.119 | 0.0309 |
| FL-40-WEXA | 0.110 | 0.0434 |
| FL-40-DEXA | 0.071 | 0.0253 |

Note:
40 W fluorescent lamps; acidic 4 wt % anatase TiO$_2$ solution coating.

Comparison Table 2 shows the color temperatures and brightness (Lm) before and after photocatalytic coating of the lamps.

TABLE 2

| | Color temperature (° K) | | Brightness (Lm) | |
|---|---|---|---|---|
| | Before coating | After coating | Before coating | After coating |
| FL-40-WA | 4212 | 4196 | 3037 | 3059 |
| FL-40-DA | 6099 | 6104 | 2792 | 2803 |
| FL-40-WEXA | 3929 | 3893 | 3500 | 3524 |
| FL-40-DEXA | 6860 | 6875 | 3309 | 3319 |

Note:
40 W fluorescent lamps; acidic 4 wt % anatase TiO2 solution coating.

From the above, it is evident that the illumination ability of the lamps after coating with anatase $TiO_2$ does not degrade, while the ability in decomposing organic gas is improved. On average, the decomposition rate of butyl acetate in rate constant is 0.025-0.043 min$^{-1}$, that is, the lamps coated with anatase $TiO_2$ can decompose 2.5-4.3% of surrounding organic gas every single minute.

EXAMPLE 2

1.0 mole titanium alkoxide is added into water for hydrolysis. The resultant solution has a $H_2O$/titanium alkoxide mole ratio of about 100. The titanium alkoxide is hydrolyzed to become white $H_xTiO_{[(4-x)/2+x]} \cdot nH_2O$ gel solution. After filtrating and then water-washing the hydrolysate solution, $H_xTiO_{[(4-x)/2+x]} \cdot nH_2O$ gel is obtained, which is then diluted with water that is 0.1-1.0 times the weight of the gel. The pH value of the diluted gel solution is thereafter adjusted by alkaline substance such as $NH_4OH$, $N(R)_4OH$, or $N(R)_3$. The pH value is adjusted to above 9.0-12.0. The alkaline substance/titanium alkoxide mole ratio is in a range of 0.05-0.5. After adjusting the pH value, the solution is stirred and heated in a hydrothermal reactor for 1-25 hours. The temperature of the hydrothermal is 100-250° C. After the hydrothermal, alkaline anatase $TiO_2$ solution gel, which is a yellow transparent liquid, is obtained. The resultant anatase $TiO_2$ sol contains 2-20 wt % $TiO_2$. The thus-formed anatase $TiO_2$ sol is analyzed by a FT-Raman spectrometer, and the result is shown in FIG. 2. The DLS particle size analysis is shown in FIG. 3. At least 80% of the particles suspended in the thus-formed anatase $TiO_2$ solution gel have particle size below 20 nm.

In this example, the 20 wt % alkaline anatase $TiO_2$ sol is used to coat various lamps (those as example 1). The fluorescent lamps are coated with anatase $TiO_2$ sol and baked at 150° C. The decomposition efficiency of the above fluorescent lamps regarding organic substance butyl acetate is measured in a 5-liter close chamber system. 5.0 µl butyl acetate is injected into the 5-liter close chamber system and measured by using FTIR during the irradiation of 40W fluorescent lamps. Brightness (Lm) before and after photocatalytic coating of the lamps is also taken. The results are shown in Table 3.

TABLE 3

| | Butyl acetate decomposition rate constant (min$^{-1}$) | Brightness (Lm) | |
|---|---|---|---|
| | | Before coating | After coating |
| FL-40-WB | 0.1036 | 3016 | 3042 |
| FL-40-DB | 0.1885 | 2741 | 2771 |

TABLE 3-continued

| | Butyl acetate decomposition rate constant (min$^{-1}$) | Brightness (Lm) | |
|---|---|---|---|
| | | Before coating | After coating |
| FL-40-WEXB | 0.269 | 3476 | 3504 |
| FL-40-DEXB | 0.1646 | 3315 | 3326 |

Note:
40 W fluorescent lamps; coated by 20 wt % anatase TiO$_2$ alkaline solution.

It is evident that the illumination ability of the lamps after coating with 20 wt % anatase TiO$_2$ does not degrade. It is found that the decomposition rate of butyl acetate is basically proportional to the thickness of the anatase TiO$_2$ coating. Compared with example 1, the thickness of the 20 wt % alkaline anatase TiO$_2$ coating is 5 times the thickness of the 4 wt % acidic anatase TiO$_2$ coating, and the decomposition rate of butyl acetate is also 5 times the decomposition rate of example 1.

According to example 1 and example 2 of fabrication of the anatase TiO$_2$ solution coated fluorescent lamp capable of cleaning air, it is evident that either the fluorescent lamps or RGB fluorescent lamps, after coating with anatase TiO$_2$, go through change on photocatalytic function and increase in illumination ability. The comparison is shown in Table 4.

TABLE 4

| | Butyl acetate decomposition rate constant (min$^{-1}$) | UV 365 nm intensity (mW/cm$^2$) | Brightness (Lm) | | Relative brightness ratio (note 1) |
|---|---|---|---|---|---|
| | | | After coating | Before coating | |
| FL-40-W-0A | 0.0309 | 0.144 | 3037 | 3059 | 1.0072 |
| FL-40-W-0B | 0.1036 | 0.144 | 3016 | 3042 | 1.0086 |
| FL-40-D-0A | 0.0324 | 0.119 | 2792 | 2803 | 1.0039 |
| FL-40-D-0B | 0.1885 | 0.119 | 2741 | 2771 | 1.0109 |
| FL-40-WEX-0A | 0.0434 | 0.110 | 3500 | 3524 | 1.0068 |
| FL-40-WEX-0B | 0.2690 | 0.110 | 3476 | 3504 | 1.0080 |
| FL-40-DEX-0A | 0.0253 | 0.071 | 3309 | 3319 | 1.0030 |
| FL-40-DEX-0B | 0.1646 | 0.071 | 3315 | 3326 | 1.0033 |

Note 1:
Relative brightness ratio: Brightness of the lamps coated with anatase TiO$_2$ (Lma)/Brightness of the lamps not coated with anatase TiO$_2$ (Lm b).

From Table 4, the RGB fluorescent lamp FL-40-WEX coated with 4 wt % acidic anatase TiO$_2$ sol presents superior photocatalytic ability amount the four fluorescent lamp, with butyl acetate decomposition rate of 0.0434 min$^{-1}$. When coated with 20 wt % alkaline anatase TiO$_2$ sol, the RGB fluorescent lamp FL-40-WEX also shows highest butyl acetate decomposition rate of 0.269 min$^{-1}$. The illumination ability of the lamps after coated with anatase TiO$_2$ does not degrade. It is surprisingly found that most lamps coated with anatase TiO$_2$ can increase illumination ability. Taking FL-40-D and FL-40-WEX as an example, their brightness increase 0.74%.

EXAMPLE 3

In this example, spiral fluorescent lamps are used. The spiral-type single end fluorescent lamps are coated with anatase TiO$_2$ by the above dip coating process to form a photocatalytic coating air cleaning fluorescent lamp. The air cleaning ability test is conducted in an 8-liter closed system. In the closed system, the spiral fluorescent lamp coated with anatase TiO$_2$ is installed therein and 2 μL butyl acetate is injected. The lamp is turned on and the gas concentration is measured by standard equipment. The result is shown in Table 5.

TABLE 5

| Lamp Type | TiO$_2$ anatase Sol Type | Butyl acetate concentration (ppm) | Butyl acetate decomposition rate constant (min$^{-1}$) | UV intensity (mW/cm$^2$) |
|---|---|---|---|---|
| Spiral lamp 23 W, D-type | as Example 1 | 53 | 0.027 | 0.189 |
| Spiral lamp 21 W, D-type | as Example 2 | 53 | 0.0676 | 0.254 |
| Spiral lamp 21 W, L-type | as Example 1 | 53 | 0.004 | 0.217 |
| | as Example 2 | 53 | 0.0718 | 0.215 |
| | as Example 1 | 53 | 0.021 | 0.476 |
| | as Example 2 | 53 | 0.1474 | 0.583 |

In this experiment, different spiral type lamps are dip coated in anatase TiO$_2$ solution. The air cleaning ability is proportional to the UV intensities of the lamps, and is also proportional to the anatase TiO$_2$ coating thickness. From Table 5, it is seen that the Spiral lamp (21W, L-type) coated with 20 wt % alkaline anatase TiO$_2$ sol as in example 2 presents a butyl acetate decomposition rate of 0.1474 min$^{-1}$, and is thus the most effective one.

EXAMPLE 4

In this example, a spiral type fluorescent lamp is used. The spiral-type single end fluorescent lamp is coated with anatase TiO$_2$ by the above dip coating process to form a photocatalytic coating air cleaning fluorescent lamp. To improve the thickness, adhesion ability, and hardness of the photocatalytic coating, H$_4$TiO$_4$ sol is added into the anatase TiO$_2$ solution, with a maximum (H$_4$TiO$_4$ gel/anatase TiO$_2$ solution) ratio of 10% in weight. The air cleaning ability test is carried in an 8-liter closed system. In this closed system, the spiral fluorescent lamp coated anatase TiO$_2$ with a little of H$_4$TiO$_4$ sol, is installed therein and 2.0 μl butyl acetate is injected. The lamp is turned on and the gas concentration is measured by standard equipment. The results are shown in Table 6.

TABLE 6

| Lamp Type | TiO2 anatase Sol Type | H$_4$TiO$_4$/anatase TiO$_2$ wt % | Butyl acetate concentration (ppm) | Butyl acetate decomposition rate constant (min$^{-1}$) |
|---|---|---|---|---|
| Spiral lamp 21 W, L-type | as Example 1 | 1 | 53 | 0.0201 |
| | as Example 2 | 1 | 53 | 0.1286 |
| | as Example 1 | 5 | 53 | 0.0204 |
| | as Example 2 | 5 | 53 | 0.0971 |
| | as Example 1 | 10 | 53 | 0.0193 |
| | as Example 2 | 10 | 53 | 0.0462 |

It is evident from example 3 and example 4 that the H$_4$TiO$_4$/anatase TiO$_2$ solution can improve the thickness, adhesion ability, and hardness of the photocatalytic coating.

From Table 6, it is found that adding $H_4TiO_4$ sol into the 4 wt % acidic anatase $TiO_2$ solution in a $H_4TiO_4$/anatase $TiO_2$ ratio of 1-10 wt %, and then using this mixture to coat the spiral lamp (21W, L-type) does not degrade the air cleaning ability of the lamp. However, the air cleaning ability of the spiral lamp (21W, L-type) are affected when $H_4TiO_4$ gel is added into the 20 wt % alkaline anatase $TiO_2$ solution in a $H_4TiO_4$/anatase $TiO_2$ ratio of 1-10 wt %, and this mixture is then used to coat the spiral lamp. It is also found that a higher the $H_4TiO_4$/anatase $TiO_2$ ratio results in a lower butyl acetate decomposition rate. It may be concluded that the $H_4TiO_4$/anatase $TiO_2$ mixture solution at a $H_4TiO_4$/anatase $TiO_2$ ratio below 10 wt % about 1.0 wt % is suitable for acidic anatase TiO2 sol for fabricating the air cleaning fluorescent lamp of this invention.

EXAMPLE 5

In this example, a spiral-type fluorescent lamp (FSL-23W EXL-type) is used. The spiral-type single end fluorescent lamp is coated with anatase $TiO_2$ one to four times by using the above-mentioned dip coating process to form a photocatalytic coating air cleaning fluorescent lamp. Likewise, the air cleaning ability test is carried out in an 8-liter closed system. In the closed system, the spiral-type single end fluorescent lamp coated with anatase $TiO_2$ is installed therein and 2 µL butyl acetate is injected. The lamp is turned on and the gas concentration is measured by standard equipment. The result is shown in Table 7.

TABLE 7

| Lamp Type | $TiO_2$ Anatase Sol Type | Numbers of dip coating | Butyl acetate concentration (ppm) | Butyl acetate decomposition rate constant (min$^{-1}$) |
|---|---|---|---|---|
| Spiral lamp FSL-23 W EXL-type | as Example 1 | 1 | 53 | 0.0127 |
| | as Example 1 | 2 | 53 | 0.0704 |
| | as Example 1 | 3 | 53 | 0.1075 |
| | as Example 1 | 4 | 53 | 0.1495 |
| | as Example 2 | 1 | 53 | 0.0676 |
| | as Example 2 | 2 | 53 | 0.1988 |
| | as Example 2 | 3 | 53 | 0.3049 |
| | as Example 2 | 4 | 53 | 0.3089 |

According to example 5, it is evident that when using the spiral-type single end fluorescent lamp coated with anatase $TiO_2$ (as used in example 1) one to four times by using the above-mentioned dip coating process to form a photocatalytic coating air cleaning fluorescent lamp, the air cleaning ability of the photocatalytic coating is proportional to the thickness of the coating thereof. The anatase $TiO_2$ solution adopted in example 1 is 4 wt % acidic anatase $TiO_2$ sol. The thickness of the coating is proportional to the number of duplicate dipping-coating, and is also proportional to butyl acetate decomposition rate. In Table 7, it is seen that the butyl acetate decomposition rate increases from 0.0127 cm$^{-1}$ to 0.1495 cm$^{-1}$. This indicates that the acidic anatase TiO2 coating is still not at its optimal coating thickness. That is, the butyl acetate decomposition rate of the acidic anatase $TiO_2$ coating may further increase if the thickness of the coating increases.

The anatase $TiO_2$ solution adopted in example 2 is 20 wt % alkaline anatase $TiO_2$ sol. The thickness of the coating is also proportional to the number of duplicate dip coating for 20 wt % alkaline anatase $TiO_2$ sol. For a lamp with three duplicate dip coatings in the 20 wt % alkaline anatase $TiO_2$ sol, the butyl acetate decomposition rate increases from 0.0676 cm$^{-1}$ to 0.3049 cm$^{-1}$. But for a lamp with four duplicate dip coatings in the 20 wt % alkaline anatase $TiO_2$ sol, the butyl acetate decomposition rate slows up to 0.3089 cm$^{-1}$. This suggests that the coating film from three 20 wt % alkaline anatase $TiO_2$ sol duplicate dip coatings is at its optimal thickness, and there is a balance between the diffusion rate of the air and organic substances between the air and the coating film to got the maximum rate about the photocatalytic reaction. After three duplicate dip coatings in the 20 wt % alkaline anatase $TiO_2$ sol, the thickness of the anatase $TiO_2$ coating is about 10 microns, which is deemed the optimal thickness of the anatase $TiO_2$ sol coating developed according to the present invention.

To sum up, the present invention provides methods for preparing nano-scale semiconductor crystalline anatase $TiO_2$ particle solution, which is used to coating various fluorescent lamps by the above-mentioned dip coating method. The coated fluorescent lamps are baked to form photocatalytic fluorescent lamps capable of cleaning air. The photocatalytic fluorescent lamps have improved brightness and illumination ability. Due to the porous characteristic of the anatase $TiO_2$ coating and its visible light photocatalytic ability, a small amount of UV light (UVA) and visible light are absorbed by the anatase $TiO_2$ coating and thus active species such as electron-hole pairs that are capable of purifying air are generated. The alkaline anatase $TiO_2$ nano-crystalline solution can reach a concentration of 20 wt %. For the lamp having three duplicate dip coatings in the 20 wt % alkaline anatase $TiO_2$ sol, the butyl acetate decomposition rate increases from 0.0676 cm$^{-1}$ to 0.3049 cm$^{-1}$, which is about 10-100 times the magnitude of the most efficient prior art $TiO_2$ coating.

The anatase $TiO_2$ nano-crystalline or doped with Eu or rare earth metal oxide on anatase $TiO_2$ nano-crystalline solution functions like fluorescent agents. The coating is carried out on outer walls of the lamps and only low temperature baking is needed. It is surprisingly found that the coating according to the present invention can increase the brightness of the lamps, which is not disclosed in any prior art.

Various types of fluorescent lamps may incorporate the present invention recipe and process thereof. The anatase $TiO_2$ sol dip coating process proposed by the present invention may be used either before the lamps fabricated or after the completion of the lamps. Furthermore, it is understood the concentration of chemicals and types of additives in this application are for illustration. Changes may be made in detail, especially in matters of shape, size, and arrangement of parts within the principles of the invention to the full extent indicated by the broad general meaning of the terms in which the appended claims are expressed.

The invention claimed is:

1. A photocatalytic fluorescent lamp capable of cleaning air and increasing brightness, comprising:
   a lamp tube comprising an anatase $TiO_2$ coating film, wherein the anatase $TiO_2$ coating film contains semiconductor nano-crystalline anatase $TiO_2$ sol doped with rare earth metal;
   wherein, when said photocatalytic fluorescent lamp is turned on, brightness of said photocatalytic fluorescent lamp increases because of a fluorescent property of said anatase $TiO_2$ coating film, and due to a porous characteristic of said anatase $TiO_2$ coating film and a visible light photocatalytic ability thereof, a small amount of UV light (UVA) and blue light transmitted from said photocatalytic fluorescent lamp is absorbed by said anatase TiO$_2$ coating film and active species that are capable of purifying air are generated.

2. The photocatalytic fluorescent lamp capable of cleaning air and increasing brightness as claimed in claim 1, wherein said anatase TiO$_2$ coating film comprises coagulated anatase TiO$_2$ semiconductor nano-crystalline particles, wherein about 80% of the particles have a particle size below about 20 nm.

3. The photocatalytic fluorescent lamp capable of cleaning air and increasing brightness as claimed in claim 1, wherein said photocatalytic fluorescent lamp further comprises a base layer coated underneath said anatase TiO$_2$ coating film, said base layer being made by sol-gel method and from SiO$_2$ sol or H$_4$TiO$_4$ solution, thereby preventing alkaline ions on a lamp glass tube surface from thermally diffusing out to said anatase TiO$_2$ coating film and decreasing the photocatalytic efficiency, thereby improving optical properties, adhesion, and hardness of said anatase TiO$_2$ coating film.

4. The photocatalytic fluorescent lamp capable of cleaning air and increasing brightness as claimed in claim 1, wherein the rare earth metal is Eu.

5. The photocatalytic fluorescent lamp capable of cleaning air and increasing brightness as claimed in claim 1, wherein the rare earth metal is less than 10 wt %.

\* \* \* \* \*